United States Patent
Hong et al.

(10) Patent No.: US 7,764,962 B2
(45) Date of Patent: Jul. 27, 2010

(54) METHOD FOR REPORTING SCAN RESULT IN MOBILE COMMUNICATION SYSTEM AND MOBILE TERMINAL AND MOBILE COMMUNICATION SYSTEM USING THE SAME

(75) Inventors: Sung Hun Hong, Seoul (KR); Ki Taek Song, Seoul (KR); Seong Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 821 days.

(21) Appl. No.: 11/710,955

(22) Filed: Feb. 27, 2007

(65) Prior Publication Data

US 2008/0051078 A1    Feb. 28, 2008

(30) Foreign Application Priority Data

Aug. 22, 2006 (KR) .................. 10-2006-0079454

(51) Int. Cl.
*H04W 4/00* (2009.01)
*H04W 36/00* (2009.01)

(52) U.S. Cl. .............. 455/434; 455/432.1; 455/437

(58) Field of Classification Search ........... 455/434, 455/437, 524, 525, 67.11, 432.1, 517, 436; 370/328, 331, 338
See application file for complete search history.

(56) References Cited

U.S. PATENT DOCUMENTS

| | | | |
|---|---|---|---|
| 6,526,286 B2 * | 2/2003 | Wan ........................ 455/515 |
| 7,440,755 B2 * | 10/2008 | Balachandran et al. ... 455/435.2 |
| 7,460,867 B2 * | 12/2008 | Kim et al. .................... 455/434 |
| 7,558,544 B2 * | 7/2009 | Kim et al. .................... 455/132 |
| 7,653,393 B2 * | 1/2010 | Kim et al. .................... 455/437 |
| 7,668,504 B2 * | 2/2010 | Kang et al. ................. 455/11.1 |
| 2004/0205158 A1 * | 10/2004 | Hsu ........................... 709/218 |
| 2005/0153692 A1 * | 7/2005 | Hwang et al. ............... 455/434 |
| 2006/0111103 A1 * | 5/2006 | Jeong et al. ................. 455/434 |
| 2007/0004430 A1 * | 1/2007 | Hyun et al. .............. 455/456.1 |

* cited by examiner

*Primary Examiner*—George Eng
*Assistant Examiner*—Brandon J Miller
(74) *Attorney, Agent, or Firm*—Birch, Stewart, Kolasch & Birch, LLP

(57) ABSTRACT

A method for reporting a scan result in a mobile communication system, which includes scanning, via a mobile terminal, neighboring base stations during a period determined by the mobile terminal, transmitting a first message to a serving base station to notify the serving base station that a scanning result acquired in the scanning step will be reported to the serving base station, and receiving, via the mobile terminal, a second message including information used for generating a report of the scanning result from the serving base station in response to the first message. The method also includes transmitting, via the mobile terminal, a third message including the scanning result acquired in the scanning step to the serving base station according to the information used for the report of the scanning result.

20 Claims, 5 Drawing Sheets

FIG. 5

| Syntax | Size(bits) | Notes |
|---|---|---|
| MOB_SCN-RSP_Message_format() { | | |
|    Management Message Type=55 | 8 | |
|    Scan duration | 8 | In units of frames. When Scan Duration is set to zero, no scanning parameters are specified in the message. When MOB_SCN-RSP is sent in response to MOB_SCN-REQ, setting Scan Duration to zero denies MOB_SCN-REQ. |
|    Report mode | 2 | 0b00 : no report<br>0b01 : periodic report<br>0b10 : event triggered report<br>0b11 : reserved |
|    reserved | 6 | Shall be set to zero |
|    Report period | 8 | Available when the value of Report Mode is set to 0b01. Report period in frames. |
|    Report metric | 8 | Bitmap indicating metrics on which the corresponding triggers are based :<br>Bit 0 : BS CINR mean<br>Bit 1 : BS RSSI mean<br>Bit 2 : Relative delay<br>Bit 3 : BS RTD ; this metric shall be only mesured on serving BS/anchor BS.<br>Bit 4~7 : reserved ; shall be set to zero |
|    if(Scan Duration !=0) { | | |
|      Start frame | 4 | |
|      reserved | 1 | Shall be set to zero. |
|      Interleaving interval | 8 | Duration in frames |
|      Scan iteration | 8 | |
|      padding | 3 | Shall be set to zero. |
|      N_Recommended_BS_Index | 8 | Number of neighboring BS to be scanned of associated, which are using BS index that corresponds to the position of BS in MOB_NBR-ADV message |

FIG. 6

| Syntax | Size(bits) | Notes |
|---|---|---|
| MOB_SCN-REP_Message_format() { | | |
|   Management Message Type=60 | 8 | |
|   Report Mode | 1 | 0 : Evnet-triggered report<br>1 : Periodic report |
|   Comp_NBR_BSID_IND | 1 | |
|   N_current_BSs | 3 | When FBSS/MDHO is supported, N_current_BSs is the number of BSs currently in the diversity set ; When FBSS/MDHO is not supported or the MS has an empty diversity set, N_current_BSs is set to 1. |
|   Reserved | 3 | |
|   Report metric | 8 | Bitmap indicating presence of certain metrics (threshold values) on which the corresponding trigger are based :<br>Bit 0 : BS CINR mean<br>Bit 1 : BS RSSI mean<br>Bit 2 : Relative delay<br>Bit 3 : BS RTD ; this metric shall be only mesured on serving BS/anchor BS.<br>Bit 4~7 : reserved ; shall be set to zero |
|   For(j=0; j<N_current_BSs; j++) | | |
|     Temp BSID | 4 | Diversity set member ID assigned to this BS. When the MS has an empty diversity set or FBSS/MDHO is not supported. Temp BSID shall be set to 0. |
|     Reserved | 4 | Shall be set to zero. |
|     If(Report metric[Bit 0]==1) | | |
|       BS CINR mean | 8 | |
|     If(Report metric[Bit 1]==1) | | |
|       BS RSSI mean | 8 | |
|     If(Report metric[Bit 2]==1) | | |
|       Relative delay | 8 | In case FBSS/MDHO is in progress, this field shall include the relative delay of BSs currently in the diversity set, except for that of the Anchor BS |
|     If(Report metric[Bit 3]==1) | | |
|       BS RTD | 8 | This field shall include the RTD of the serving BS/ anchor BS. |
|   } | | |
|   N_Neighbor_BS_Index | 8 | Number of neighboring BS which are included in MOB_NBR-ADV message |
|   If(N_Neighbor_BS_Index !=0) { | | |
|     Configuration change count for MOB_NBR-ADV | 8 | Configuration Change Count value of referring MOB_NBR-ADV message |
|   } | | |
|   For(j=0; j<N_Neighbor_BS_Index; j++) { | | |
|     N_Neighbor_BS_Index | 8 | BS index corresponds to position of BS in MOB_NBR-ADV message | ized
METHOD FOR REPORTING SCAN RESULT IN MOBILE COMMUNICATION SYSTEM AND MOBILE TERMINAL AND MOBILE COMMUNICATION SYSTEM USING THE SAME This application claims priority to Korean Patent Application No. 10-2006-0079454, filed on Aug. 22, 2006, which is hereby incorporated by reference in its entirety.

BACKGROUND OF THE INVENTION

1. Field of the Invention

The present invention relates to a mobile terminal and corresponding mobile communication system in which the mobile terminal autonomously initiates a base station scanning operation.

2. Discussion of the Related Art

In the related art, the base station transmits a message including a scanning interval allocation and an information necessary for the report of the scan result to the mobile terminal. The mobile terminal then performs a scanning process during the allocated scanning interval and reports the scan result acquired during the scanning process to the base station.

Thus, in the related art, the base station is solely responsible for initiating the scanning process. Furthermore, because the base station determines whether or not the scan result is reported and a point of time when the scan result is reported, the scan result can only be reported at the request of the base station.

SUMMARY OF THE INVENTION

Accordingly, one object of the present invention is to address the above-noted and other problems.

Another object of the present invention is to provide a base station with a scan result that is obtained by an autonomous scanning operation of a terminal.

Yet another object of the present invention is to allow a terminal to determine whether or not a scan result is reported and a point of time when the scan result is reported.

To achieve these objects and other advantages and in accordance with the purpose of the invention, as embodied and broadly described herein, the present invention provides in one aspect a method for reporting a scan result in a mobile communication system, which includes scanning, via a mobile terminal, neighboring base stations during a period determined by the mobile terminal, transmitting a first message to a serving base station to notify the serving base station that a scanning result acquired in the scanning step will be reported to the serving base station, and receiving, via the mobile terminal, a second message including information used for generating a report of the scanning result from the serving base station in response to the first message. The method also includes transmitting, via the mobile terminal, a third message including the scanning result acquired in the scanning step to the serving base station according to the information used for generating the report of the scanning result. The present invention also provides a corresponding mobile communication system and mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is an overview illustrating a response message according to an embodiment of the present invention; and FIG. 6 is an overview illustrating a scan result report message according to an embodiment of the present invention.

DETAILED DESCRIPTION OF THE INVENTION

Reference will now be made in detail to the preferred embodiments of the present invention, examples of which are illustrated in the accompanying drawings.

Figure 1:
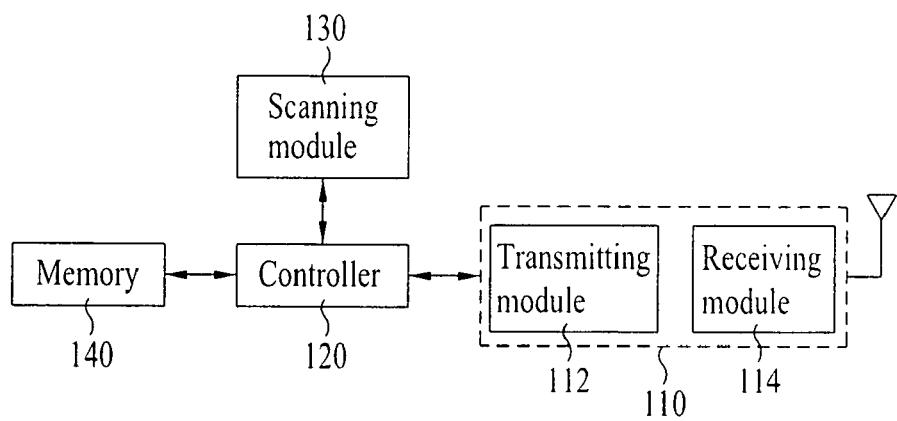
FIG. 1 is a block diagram illustrating a mobile terminal which reports a scan result in a mobile communication system according to an embodiment of the present invention.

Turning first to FIG. 1, which is a block diagram illustrating a mobile terminal according to an embodiment of the present invention. As shown, the mobile terminal includes a transceiver 110 which transmits/receives a message or data to/from a base station over a mobile communication system, a controller 120 which controls the overall operation of the mobile terminal, a scanning module 130 which performs a scanning operation, and a memory 140 which stores a scan result acquired by the scanning module 130. Further, the transceiver 110 includes a transmitting module 112 which transmits a message to the base station, and a receiving module 114 which receives a message from the base station.

Further, in one example, the transceiver 110 is independent of a mobile communication module (not shown) which performs a transmission/reception operation of a wireless communication signal. In addition, in the present invention, the transceiver 110 transmits a scan result report notification message, which notifies the base station that the scan result acquired by the scanning module 130 will be reported via the transmitting module 112, and receives a corresponding response message from the base station via the receiving module 114.

In addition, the response message includes a scanning interval and other information used for generating a report of the scan result. The base station is a serving base station, which transmits/receives the message or the data to/from the mobile terminal over the mobile communication system.

Further, when the scanning interval is transmitted by the base station to perform the scanning operation, the mobile terminal transmits information on the scan result to the base station by including the information in the scan result report message. However, when the mobile terminal performs an autonomous scanning operation in a state where the scanning interval is not allocated by the base station, the scan result can be provided to the base station without a request from the base station. The autonomous scanning operation means the mobile terminal performs a scanning process during a period determined by the mobile terminal.

A description of the mobile terminal performing the autonomous scanning operation will now be described. In more detail, the transceiver 110 first transmits a scan result report notification message to the base station. The scan result report notification message notifies the base station that the scan result acquired by the scanning module 130 will be reported. In addition, the scan result report notification message may also notify the base station that scan results acquired by all scanning operations including the autonomous operation will be reported.

Further, the scan result report notification message may be, for example, a scanning interval allocation message. Thus, the transceiver 110 may notify the base station that the scan results will be reported using the scanning interval allocation message. Also, the scanning interval allocation message may be a MOB_SCN-REQ message specified by IEEE. The scan result report notification message may also be an additional message for notifying that the scan result will be reported.

In addition, the scan result report notification message includes an additional field used to notify the base station that the scan result will be reported. For example, the additional field may include the value of "0" or "1" with the value "0" indicating the scan result will be reported and the value "1" indicating the mobile terminal is requesting the scanning interval allocation from the base station. That is, when the value of the field is "0", the scanning operation according to the present invention is performed.

When the value of the field is "0", the mobile terminal need not include additional information on the scanning interval allocation in the scan result report notification message. However, when the value of the field is "0", the scan result report notification message may include the information necessary for the report of the scan result. At this time, the value of the field and the information included in the scan result report notification message are set by the controller 120.

Next, the transceiver 110 receives a response message from the base station including a scan duration, report mode and period and other information necessary for generating the report of the scan result, in response to the scan result report notification message. The response message may be, for example, a response message for the scanning interval allocation message or may be an additional message which provides the information necessary for generating the report of the scan result. More particularly, the response message may be a MOB_SCN-RSP message specified by IEEE.

In more detail, FIG. 5 illustrates a structure of the MOB_SCN-RSP message specified by IEEE including the information of the present invention. As shown in FIG. 5, the response message is a response message for the scanning interval allocation message and provides a variety of information including the scanning interval allocation and the scanning operation.

More particularly, according to the present invention, the response message includes the information necessary for generating the report of the scan result such as information on a report mode, a report period and a scan result value to be reported. Further, when the value of a "Scan duration" field for the scanning interval allocation is set to "0", the response message indicates a non-allocation scanning interval (i.e., no scanning parameters are specified in the response).

In addition, the response message also includes information that the mobile terminal uses to generate and report the results of its scanning operation. That is, each base station informs the respective mobile terminal on what information it needs in the scan report message, which may be different for different base stations.

In more detail, and as shown in FIG. 5, the response message includes a "Report mode" field which identifies the report mode. More particularly, when the value of the "Report mode" field is set to "0b01", the report mode is set to a periodic report mode for periodically reporting the scan result. A value of "0b00" indicates no report, a value of "0b10" indicates an event triggered report (i.e., send the report when a particular event happens), and a value of "0b11" corresponds to a reserved field.

Further, the response message also includes a "Report period" field for specifying a report period. In general, the report period is specified by a number of frames. The report period is used when the value of the "Report mode" field is "0b01." In addition, as shown in FIG. 5, the response message also includes a "Report metric" field for specifying parameters related to the base station.

In more detail, the scan result value to be reported is generally a value indicating a received signal strength. The received signal strength includes a "BS CINR mean" indicating a signal-to-noise ratio of the base station, and a "BS RSSI mean" indicating the strength of the received signal. The "BS CINR mean" is an abbreviation for "base station carrier-to-interference-and-noise ratio mean" and means a mean value of carrier-to-interference-and-noise ratio in a specific base station. The "BS RSSI mean" is an abbreviation for "base station received signal strength indication mean" and means a mean value of the received signal strength in a specific base station. The information in the "Report metric" field may also be a relative delay, etc.

Further, with reference to FIG. 1, the controller 120 controls the overall operation of the mobile terminal. More particularly, in the present invention, the controller 120 extracts the information necessary for the report of the scan result from the response message and outputs a control signal corresponding thereto. That is, the controller 120 extracts the report mode, the report period, the report metric, etc. from the response message to determine how to report the scan result.

In addition, the scan mode in the scanning allocation message transmitted to the base station was set to zero, and the scan duration field in the in the response message received from the base station was set to zero. Thus, the mobile terminal is performing an autonomous scanning operation that was not initiated by the base station. Alternatively, if the scan duration was not set to zero, the response message would include scanning parameters to indicate how the mobile terminal should perform the scanning operation. In this instance, the base station is instructing the mobile terminal to perform the scanning operation, which is then not an autonomous scanning operation.

Therefore, when the scan duration field (and scan mode field in the request message transmitted to the base station) is set to zero, the mobile terminal performs an autonomous scanning operation. That is, the scanning module 130 scans neighboring base stations. After performing the autonomous scanning operation, the transceiver 110 transmits the scan result report message to the base station according to the control signal of the controller 120.

As discussed above, the scan result report message may be a MOB_SCN-REP message specified by IEEE. For example, FIG. 6 illustrates a structure of such a MOB_SCN-REP message. As shown in FIG. 6, the MOB_SCN-REP message includes the report mode, the number of current base stations, the report metric, the delay, etc. That is, the scan result report message includes the results of the scanning operation based on the parameters set forth in the MOB_SCN-RSP message from the base station.

In more detail, assume the report mode of the scan result is the periodic report mode and the scan result value to be reported is "CINR" or "RSSI". In this example, the scan result report message notifies the base station that the scan result will be periodically reported when the value of the field "Report mode" is set to "1". Further, the "BS CINR mean" will be provided when the bit value of the field "Report metric" is set to "0" and the "BS RSSI mean" will be provided when the bit value of the field "Report metric" is set to "1".

Returning to FIG. 1, the transceiver 110 transmits the scan result report message to the base station at a predetermined period according to the information on the report period included in the response message from the base station. That is, the response message from the base station informs the mobile terminal when to report the scan result (i.e., the report period field in the response message from the base station).

Further, the memory 140 stores a program necessary for the overall operation of the mobile terminal as well as all data input and output to and from the mobile terminal. The memory 140 also stores the scan result acquired by the scanning module 130. As discussed above, the stored scan result is included in the scan result report message transmitted to the base station.

Figure 2:
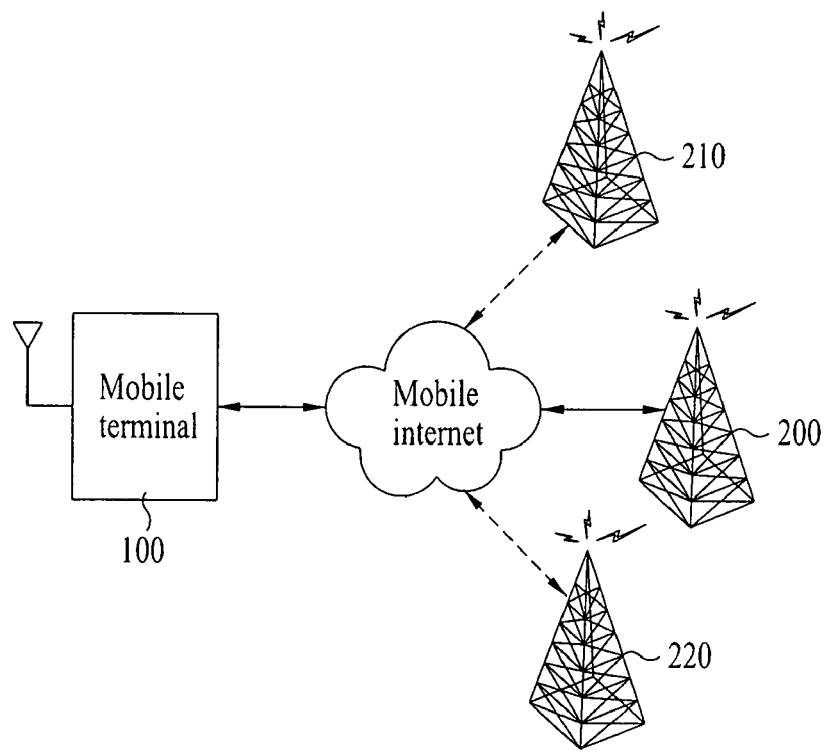
FIG. 2 is an overview illustrating a mobile communication system which reports a scan result according to an embodiment of the present invention.

Turning next to FIG. 2, which is an overview of a mobile terminal 100 communicating with base stations 200, 210 and 220 via a mobile Internet. Thus, the mobile terminal 100 transmits/receives a message and data to/from the serving base station 200 over the mobile Internet. When the mobile terminal wants to autonomously perform a scanning operation according to an embodiment of the present invention, the mobile terminal 100 transmits a first message notifying the serving base station 200 that a scan result will be reported. As discussed above, this message can be a scanning interval allocation message such as a MOB_SCN-REQ message specified by IEEE.

Then, the mobile terminal 100 receives a second message including the information used for generating and reporting the scan result from the serving base station 200. The message received from the serving base station 200 may be the MOB_SCN-RSP message shown in FIG. 5. As discussed above, the information in this message informs the mobile terminal 100 on what information to gather when performing the autonomous scanning operation.

Further, in one example, the mobile terminal 100 then scans the neighboring base stations 210 and 220 during a period determined by the mobile terminal 100 before transmitting the first message. Alternatively, in another example, the mobile terminal 100 may perform the scanning operation during a period determined by the mobile terminal 100 after transmitting the first message or before transmitting the message for reporting the scan result.

In addition, after performing the scanning operation, the mobile terminal 100 transmits a third message including the scan result of the neighboring base stations 210 and 220 to the serving base station 200. As discussed above, this message may be the MOB_SCN-REP message shown in FIG. 6.

Figure 3:
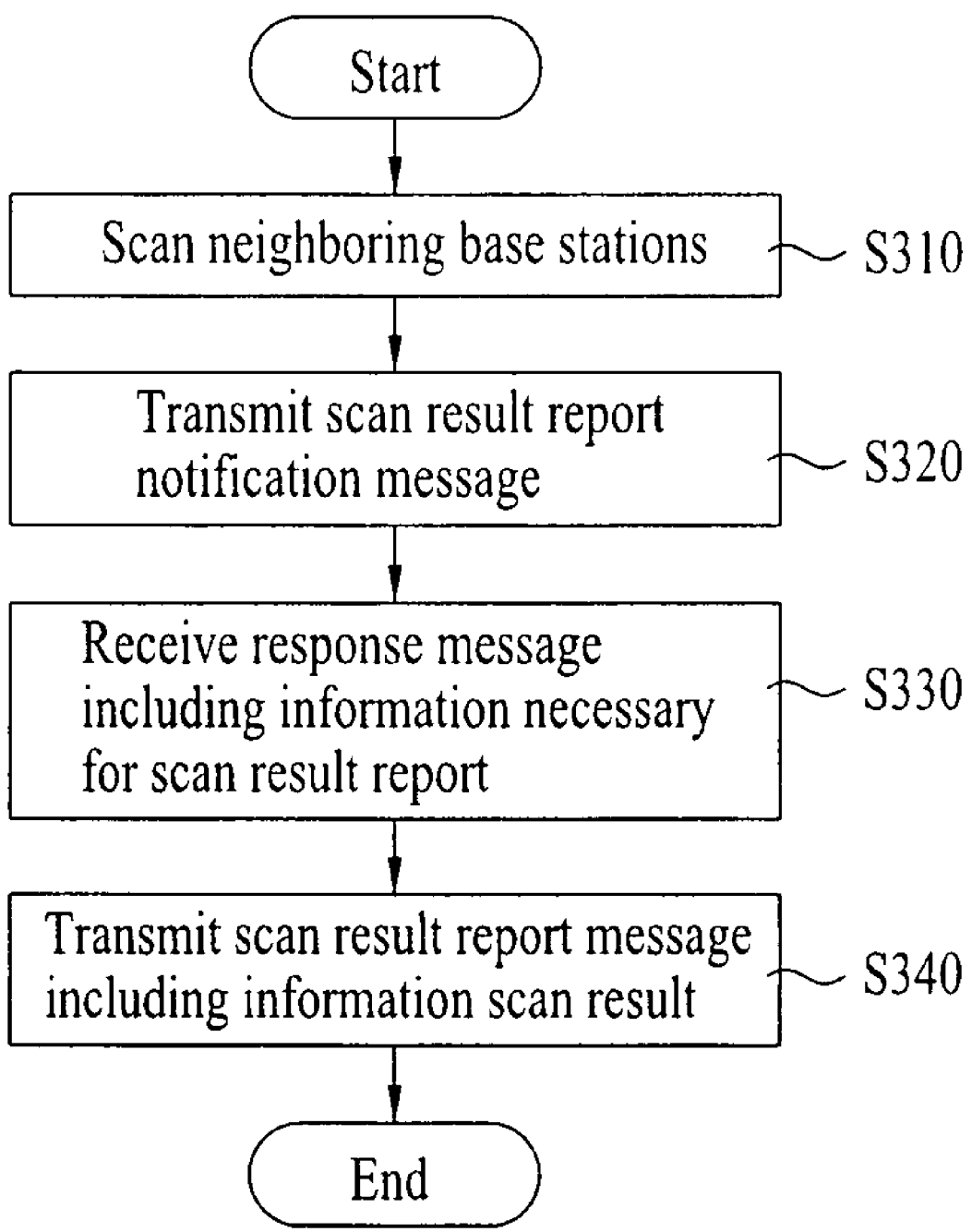
FIG. 3 is a flowchart illustrating a method for reporting a scan result in the mobile communication system according to an embodiment of the present invention.

Turning now to FIG. 3, which is a flowchart illustrating a method for reporting the scan results in the mobile communication system according to an embodiment of the present invention. FIG. 2 will also be referred to in this description.

First, as shown in FIG. 3, the mobile terminal 100 scans the neighboring base stations 210 and 220 during a period determined by the mobile terminal 100 (S310). That is, the mobile terminal 100 performs an autonomous scanning operation during a period determined by the mobile terminal without the serving base station 200 instructing the mobile terminal 100 to perform the scanning operation.

Then, the mobile terminal 100 transmits the scan result report notification message to the serving base station 200 to notify the serving base station 200 that the scan result acquired in the scanning step will be reported (S320). As discussed above, the scan result report notification message may be, for example, the scanning interval allocation message. Further, the scan result report notification message includes an additional field which notifies the serving base station 200 that the scan result will be reported. For example, the scan result report notification message can notify the serving base station 200 that the scan result will be reported when the value of the field is "0." Alternatively, the mobile terminal 100 can request a scanning interval allocation from the serving base station 200 when the value of the field is "1".

Next, the mobile terminal 100 receives the response message including the non-allocation scanning interval and the information necessary for generating the scanning result report from the serving base station 200, in response to the scan result report notification message (S330). As discussed above, the response message may be, for example, the response message for the scanning interval allocation message and includes information on the report mode, the report period, the scan result value to be reported, etc.

Further, the mobile terminal 100 can also perform the scanning operation even during the report period according to the information on the report period included in the response message, rather than before transmitting the message for reporting the scan result to the serving base station 200.

Next, the mobile terminal 100 transmits the scan result report message including the scan result acquired by the scanning operation to the serving base station 200 (S340). At this time, the scan result may be acquired in the scanning step S310 or by a scanning operation performed in the report period. Further, as discussed above, the scan result report message may be, for example, the MOB_SCN-REP specified by IEEE. The mobile terminal 100 may also transmit the scan result report message to the serving base station 200 at the predetermined period according to the information on the report period included in the response message.

Figure 4:
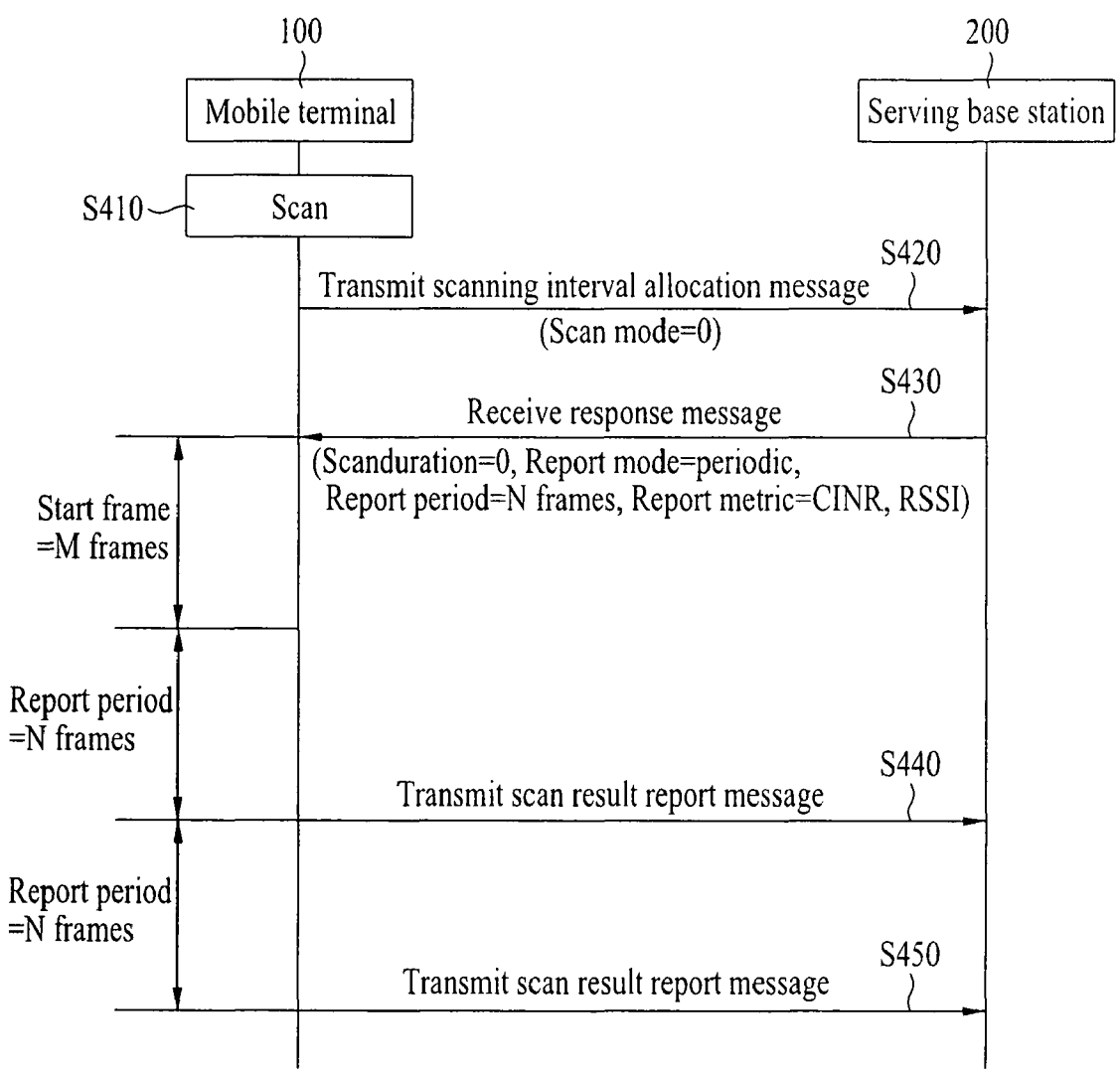
FIG. 4 is a flow diagram illustrating communication between a mobile terminal and corresponding serving base station when reporting a scan result in the mobile communication system according to an embodiment of the present invention.

Next, FIG. 4 is a flow diagram showing the communications between the mobile terminal 100 and the serving base station 200. As shown, the mobile terminal 100 scans the neighboring base stations 210 and 220 during a period determined by the mobile terminal 100 (S410). Then, the mobile terminal 100 transmits the scanning interval allocation message to the serving base station 200 to notify the serving base station 200 that the scan result acquired in the scanning step (S410) will be reported (S420). As discussed above, the scanning interval allocation message may be the MOB_SCN-REQ message specified by IEEE.

Further, in the scanning interval allocation message, an additional field "Scan mode" which notifies that the scan result will be reported is set. The scanning interval allocation message notifies that the scan result will be reported when the value of the field "Scan mode" is "0" and requests the scanning interval allocation when the value of the field "Scan mode" is "1".

The mobile terminal 100 then receives the response message for the scanning interval allocation message from the serving base station 200 as the message including the information used for generating the report of the scan result (S430). At this time, the response message includes the scanning interval allocation and the information used for generating the report of the scan result. The response message may be the MOB_SCN-RSP message specified by IEEE.

The response message also includes the information on the report mode, the report period, the scan result value to be reported as the information used for generating the report of the scan result, as shown in FIG. 5. When the value of the field "Scan duration" for the scanning interval allocation is set to "0", the response message indicates a non-allocation scanning interval. The response message also requests the mobile terminal 100 to report the scan result.

When the value of the field "Report mode" in the configuration of the response message is set to "0b01", the mobile terminal 100 sets the periodic report mode which periodically reports the scan result. Further, the mobile terminal 100 sets the report period of N frames using the information included in the field "Report period". The mobile terminal 100 also sets the "BS RSSI" indicating the received signal strength of the base station or the "BS CINR" indicating the signal-to-noise ratio of the base station using the information included in the field "Report metric" as the scan result value.

Alternatively, the mobile terminal 100 may indicate the autonomous scanning operation in the report period. Then, as shown in FIG. 4, the mobile terminal 100 transmits the scan result report message including the scan result acquired by the scanning operation in the report period or in the scanning step S410 to the serving base station 200 at the report period (S440). The scan result report message may be the MOB_SCN-REP specified by IEEE.

In addition, as shown in FIG. 6, when the value of the field "Report mode" is set to "1", the scan result report message notifies that the scan result will be periodically reported. Further, the scan result report message notifies that the "BS CINR mean" will be provided when the bit value of the field "Report metric" is set to "0" and the "BS RSSI mean" will be provided when it is set to "1".

When the number of reports of the scan result is set to be plural, the mobile terminal 100 provides the scan result to the serving base station 200 according to the set number. At this time, the number of reports may be set in the response message. Alternatively, the number of reports may be autonomously set by the mobile terminal 100. That is, as shown in FIG. 4, the mobile terminal 100 transmits the scan result report message including the scan result to the serving base station 200 at the reported period (S450).

Thus, according to the present invention, because the mobile terminal can determine whether or not a scan result is reported and a point of time when the scan result is reported, it is possible to always provide the serving base station with the scan result of neighboring base stations used in a handover operation. Accordingly, it is possible to quickly perform the handover operation using the scan result of the neighboring base stations which is previously stored when the handover is determined by the serving base station.

That is, according to the present invention, it is possible to quickly provide the serving base station with the scan result acquired by a scanning operation which is autonomously performed by the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reporting a scan result in a mobile communication system, the method comprising:

scanning, via a mobile terminal, neighboring base stations during a period determined by the mobile terminal;

transmitting a first message to a serving base station to notify the serving base station that a scanning result acquired in the scanning step will be reported to the serving base station;

receiving, via the mobile terminal, a second message including information used for generating a report of the scanning result from the serving base station in response to the first message; and transmitting, via the mobile terminal, a third message including the scanning result acquired in the scanning step to the serving base station according to the information used for generating the report of the scanning result.

2. The method of claim 1, wherein the first message comprises a scan result report notification message, the second message comprises a response message including information used for generating the report of the scanning result and the third message comprises a scan result report message including the scanning result acquired in the scanning step.

3. The method of claim 2, wherein the second message comprises a MOB_SCN-RSP_Message and the third message comprises a MOB_SCN-REP_Message specified by IEEE.

4. The method of claim 2, wherein the scan result report notification message includes an additional field for notifying the serving base station that the scanning result will be reported.

5. The method of claim 2, wherein the scan result report notification message is a scanning interval allocation message and the response message is a response message for the scanning interval allocation message.

6. The method of claim 2, wherein the transmitting step comprises transmitting the scan result report message at a predetermined period according to the information used for generating the report.

7. The method of claim 1, wherein the information used for generating the report is at least one of information on a report mode, information on a report period and a scan result value to be reported to the serving base station.

8. A mobile communication system, comprising:

a mobile terminal configured to scan neighboring base stations during a period determined by the mobile terminal; and a serving base station configured to receive a first message transmitted by the mobile terminal notifying the serving base station that a scanning result acquired by the mobile terminal will be reported to the serving base station, and to transmit a second message to the mobile terminal including information used for generating a report of the scanning result in response to the first message, wherein the mobile terminal transmits a third message including the scanning result acquired by the mobile terminal to the serving base station according to the information used for generating the report of the scanning result.

9. The system of claim 8, wherein the first message comprises a scan result report notification message, the second message comprises a response message including information used for generating the report of the scanning result and the third message comprises a scan result report message including the scanning result acquired in the scanning step.

10. The system of claim 9, wherein the second message comprises a MOB_SCN-RSP_Message and the third message comprises a MOB_SCN-REP_Message specified by IEEE.

11. The system of claim 9, wherein the scan result report notification message includes an additional field for notifying the serving base station that the scanning result will be reported.

12. The system of claim 9, wherein the scan result report notification message is a scanning interval allocation message and the response message is a response message for the scanning interval allocation message.

13. The system of claim 9, wherein the transmitting step comprises transmitting the scan result report message at a predetermined period according to the information used for generating the report.

14. The system of claim 8, wherein the information used for generating the report is at least one of information on a report mode, information on a report period and a scan result value to be reported to the serving base station.

15. A mobile terminal for reporting a scan result in a mobile communication system, the mobile terminal comprising:
a scanning module configured to scan neighboring base stations during a period determined by the mobile terminal;
a transmitting module configured to transmit a first message to a serving base station to notify the serving base station that a scanning result acquired by the scanning module will be reported to the serving base station; and
a receiving module configured to receive a second message including information used for generating a report of the scanning result from the serving base station in response to the first message,
wherein the transmitting module transmits a third message including the scanning result acquired by the scanning module to the serving base station according to the information used for generating the report of the scanning result.

16. The mobile terminal of claim 15, wherein the first message comprises a scan result report notification message, the second message comprises a response message including information used for generating the report of the scanning result and the third message comprises a scan result report message including the scanning result acquired in the scanning step.

17. The mobile terminal of claim 16, wherein the second message comprises a MOB_SCN-RSP_Message and the third message comprises a MOB_SCN-REP_Message specified by IEEE.

18. The mobile terminal of claim 16, wherein the scan result report notification message includes an additional field for notifying the serving base station that the scanning result will be reported.

19. The mobile terminal of claim 16, wherein the scan result report notification message is a scanning interval allocation message and the response message is a response message for the scanning interval allocation message, and
wherein the information used for generating the report is at least one of information on a report mode, information on a report period and a scan result value to be reported to the serving base station.

20. The mobile terminal of claim 16, wherein the transmitting module transmits the scan result report message at a predetermined period according to the information used for generating the report.

* * * * *